US008604694B2

(12) United States Patent
Yeulash et al.

(10) Patent No.: US 8,604,694 B2
(45) Date of Patent: Dec. 10, 2013

(54) DISCHARGE DEVICE HAVING HIGH-VOLTAGE CIRCUIT UNIT INSTALLED THEREIN

(75) Inventors: Mikalai Yeulash, Seoul (KR); Dong Hyun Choi, Seoul (KR); Mo Ha Ahn, Seoul (KR)

(73) Assignee: Sudo Premium Engineering Co., Ltd. (KR)

( * ) Notice: Subject to any disclaimer, the term of this patent is extended or adjusted under 35 U.S.C. 154(b) by 167 days.

(21) Appl. No.: 13/141,762

(22) PCT Filed: Dec. 21, 2009

(86) PCT No.: PCT/KR2009/007627

§ 371 (c)(1), (2), (4) Date: Jun. 23, 2011

(87) PCT Pub. No.: WO2010/074464

PCT Pub. Date: Jul. 1, 2010

(65) Prior Publication Data

US 2011/0254444 A1 Oct. 20, 2011

(30) Foreign Application Priority Data

Dec. 23, 2008 (KR) ........................ 10-2008-0132550

(51) Int. Cl.
*H01J 7/44* (2006.01)
*H02H 1/00* (2006.01)

(52) U.S. Cl.
USPC .................. 315/70; 315/32; 315/39; 361/231

(58) Field of Classification Search
USPC ......................... 315/32, 57, 70; 361/230–235
See application file for complete search history.

(56) References Cited

U.S. PATENT DOCUMENTS

| | | | | |
|---|---|---|---|---|
| 3,735,925 | A * | 5/1973 | Benedek et al. | 239/704 |
| 6,040,659 | A * | 3/2000 | Masuda et al. | 315/56 |
| 6,522,084 | B1 * | 2/2003 | Miyazaki et al. | 315/248 |
| 6,607,647 | B2 * | 8/2003 | Wilkins et al. | 204/523 |
| 6,864,635 | B2 * | 3/2005 | Moon | 315/56 |
| 7,040,101 | B2 * | 5/2006 | Takeda et al. | 62/78 |
| 7,312,973 | B2 * | 12/2007 | Sekoguchi et al. | 361/231 |
| 7,663,321 | B2 * | 2/2010 | Zhang et al. | 315/209 R |
| 2007/0228999 | A1 * | 10/2007 | Kit | 315/291 |
| 2009/0046223 | A1 * | 2/2009 | Hashimotodani et al. | 349/70 |

FOREIGN PATENT DOCUMENTS

| | | |
|---|---|---|
| CN | 2033949 | 3/1989 |
| JP | 2000202713 | 7/2000 |
| JP | 2002065836 | 3/2002 |
| JP | 2005093410 | 4/2005 |

(Continued)

OTHER PUBLICATIONS

Li Xuelin, CN 2033949 U, High effect negative ion producer (Mar. 8, 1989).*

(Continued)

*Primary Examiner* — Shawki Ismail
*Assistant Examiner* — Nelson Correa
(74) *Attorney, Agent, or Firm* — Bacon & Thomas, PLLC

(57) ABSTRACT

A discharge device includes a dielectric, a first electrode and a second electrode arranged with the dielectric interposed therebetween, and a circuit unit to which the first electrode and the second electrode are electrically connected for generating a high voltage to be applied to the first electrode and to the second electrode. The dielectric is formed in a tube shape or a pipe shape having therein the circuit unit.

13 Claims, 3 Drawing Sheets

(56) References Cited

FOREIGN PATENT DOCUMENTS

| | | |
|---|---|---|
| KR | 1020050028608 | 3/2005 |
| KR | 100566852 | 4/2006 |
| KR | 100654277 | 12/2006 |
| WO | 2005029924 | 3/2005 |
| WO | 2008/038527 | 4/2008 |

OTHER PUBLICATIONS

Office Action dated Jun. 26, 2013 issued in the corresponding Chinese application No. 200980151991.0 (w/English translation thereof).

The Japanese Office Action dated Mar. 5, 2013 and the English summary thereof.

* cited by examiner

DISCHARGE DEVICE HAVING HIGH-VOLTAGE CIRCUIT UNIT INSTALLED THEREIN

TECHNICAL FIELD

The present invention relates to a discharge device; and, more particularly, to a discharge device having a circuit unit for generating a high voltage therein.

BACKGROUND ART

In general, a discharge device provides a clean air by removing unpleasant odors such as cigarette, sweat and the like and sterilizing viruses, molds, mites and the like. This discharge device includes a high voltage electrode and a ground electrode arranged with a dielectric interposed therebetween, and a high voltage is applied between the high voltage electrode and the ground electrode from a circuit unit for generating a high voltage which is separately provided at the outside of the discharge device. The discharge device oxidizes pollutants by generating a large amount of oxidation group and hydroxyl group ions ($O_2$, $O_2-$, $O_2+$, $HO_2-$, OH− and the like) during plasma discharge, thereby sterilizing, deodorizing, purifying indoor air.

In the discharge device, the dielectric is made of glass, quartz, ceramic, film or the like.

DISCLOSURE OF INVENTION

Technical Problem

As described above, since the circuit unit for generating a high voltage is separately disposed, the discharge device of a conventional art is hard to be installed in a limited space. Moreover, the output and the durability of the conventional discharge device may be decreased depending on the length of the wire applying a voltage. Further, the exposure of the high-voltage circuit unit may cause safety accidents. When a casing is provided to prevent the exposure of the high-voltage circuit unit, additional components are required, and this decreases cost-effectiveness.

In view of the above, the present invention provides a discharge device in which a circuit unit for generating a high voltage is installed in an interior of the discharge device, to thereby achieve benefits that the installation space for the novel discharge device can be minimized compared to that of a conventional discharge device having a circuit unit for generating a high voltage installed separately; components such as a wire for applying a high voltage to an electrode can be omitted, and thus the durability of the discharge device can be improved and the safety accidents and the output decrease for the discharge device can be prevented; and a casing for preventing exposure of a high voltage unit is not required and, thus, the manufacturing cost can be reduced.

Solution to Problem

In accordance with a primary aspect of the present invention, there is provided a discharge device including: a dielectric; a first electrode and a second electrode arranged with the dielectric interposed therebetween; and a circuit unit to which the first electrode and the second electrode are electrically connected, for generating a high voltage to be applied to the first electrode and the second electrode, wherein the dielectric is formed in a tube shape or a pipe shape having the circuit unit installed therein.

Advantageous Effects of Invention

According to the present invention, a circuit unit for generating a high voltage is installed in an interior of a discharge device. Therefore, the installation space for the novel discharge device can be minimized compared to that of a conventional discharge device having a circuit unit for generating a high voltage installed separately. Further, components such as a wire for applying a high voltage to an electrode can be omitted, and therefore the durability of the discharge device can be improved and the safety accidents and the output decrease for the discharge device can be prevented. Besides, a casing for preventing exposure of a high voltage unit is not required and, thus, the manufacturing cost can be reduced.

BEST MODE FOR CARRYING OUT THE INVENTION

Figure 1:
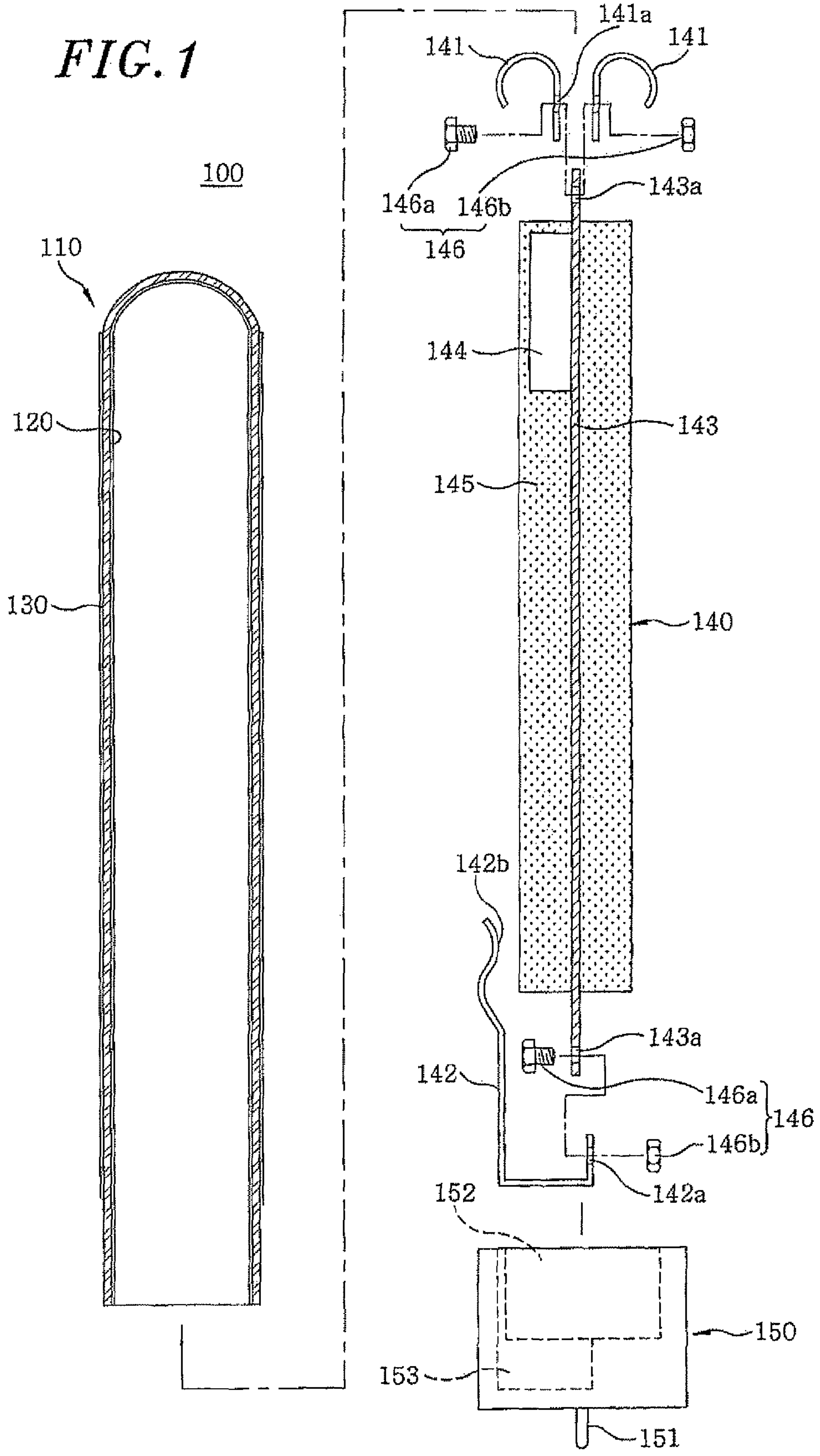
FIG. 1 is an exploded view of a discharge device having a circuit unit installed therein in accordance with an embodiment of the present invention.
Figure 2:
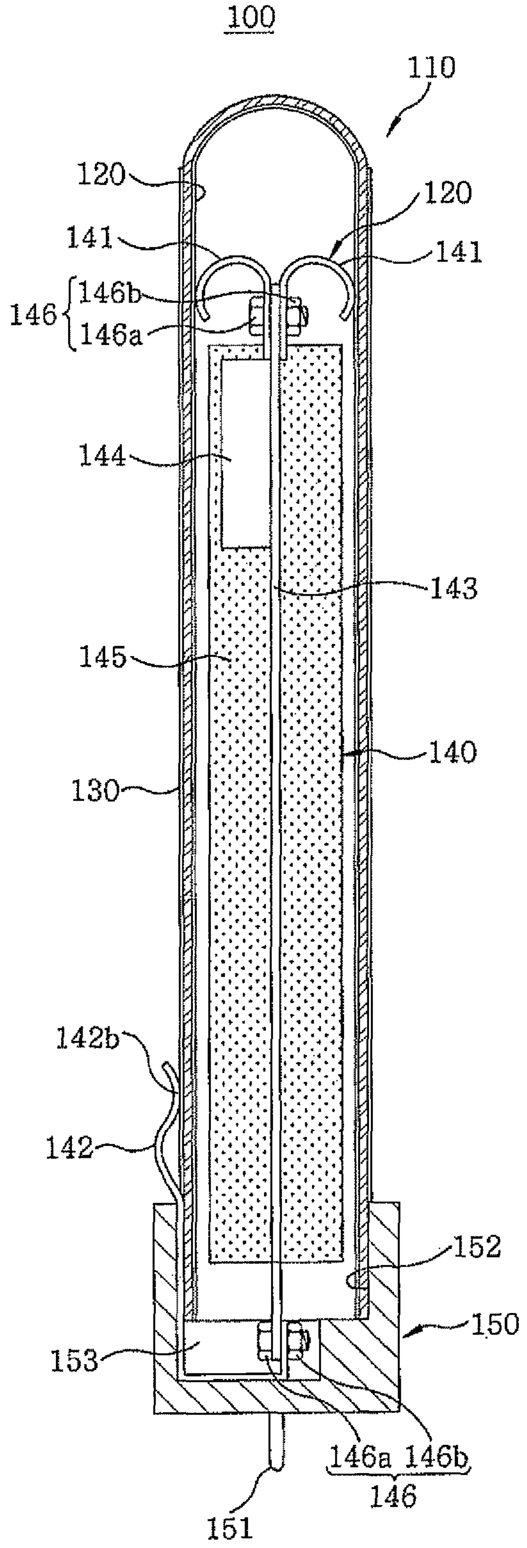
FIG. 2 is a front view of the discharge device having a circuit unit installed therein in accordance with the embodiment of the present invention.
Figure 3:
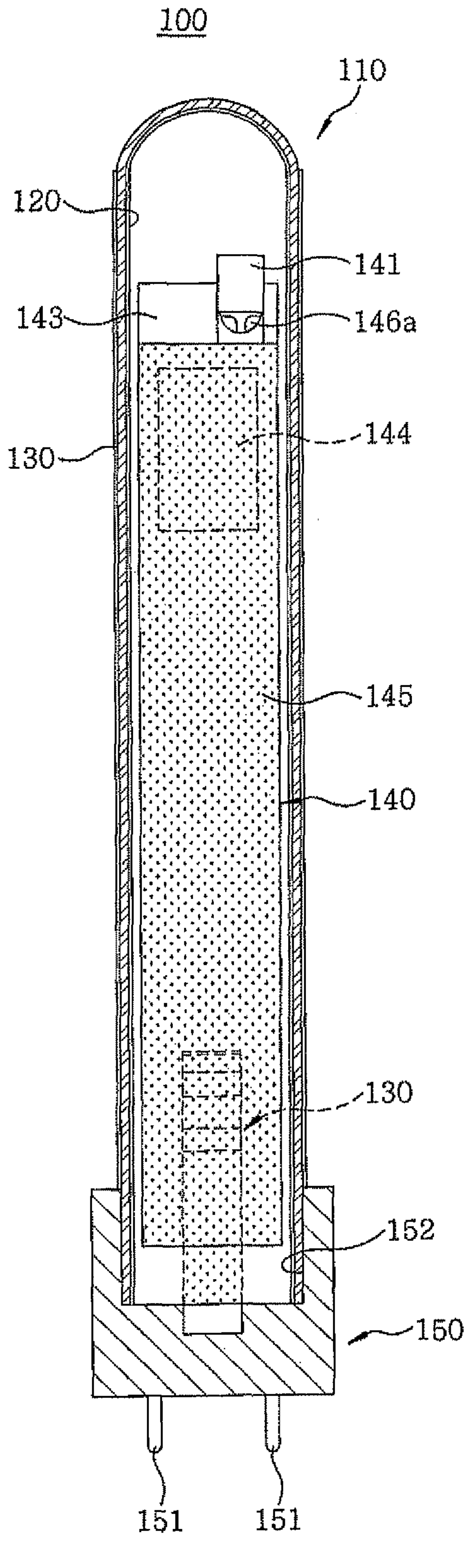
FIG. 3 is a side view of the discharge device having a circuit unit installed therein in accordance with the embodiment of the present invention.

Hereinafter, the embodiments of the present invention will be described with reference to the accompanying drawings. Further, the specific description of well-known functions or configurations which is unnecessary in explaining the present invention will be omitted, FIG. 1 is an exploded view of a discharge device having a circuit unit installed therein in accordance with an embodiment of the present invention; FIG. 2 is a front view of the discharge device having a circuit unit installed therein in accordance with the embodiment of the present invention; and FIG. 3 is a side view of the discharge device having a circuit unit installed therein in accordance with the embodiment of the present invention. As illustrated, a discharge device 100 having a circuit unit installed therein in accordance with an embodiment of the present invention includes: a dielectric 110; a first electrode 120 and a second electrode 130 arranged with the dielectric 110 interposed therebetween; and a circuit unit 140 to which the first electrode 120 and the second electrode 130 are connected.

The dielectric 110 may have various shapes such as a flat or curved plate, a polyhedron and the like. In this embodiment, the dielectric 110 is formed in a tube shape or a pipe shape, and has the circuit unit 140 installed therein.

The first electrode 120 and the second electrode 130 are arranged with the dielectric 110 interposed therebetween. In case where the dielectric 110 is formed in a tube shape or a pipe shape, the first electrode 120 and the second electrode 130 are disposed at an inner surface and an outer surface of the dielectric 110, respectively.

The first electrode 120 is made of a conductive material, e.g., including at least one among silver, nickel, copper, aluminum and the like which has low electrical resistance and high durability, in order to generate a large amount of ions. The first electrode 120 includes a coating layer applied on one surface of the dielectric 110, e.g., the inner surface of the dielectric 110.

The second electrode 130 is made of a material including at least one among silver, nickel, stainless steel, copper, aluminum and the like, in order to generate a large amount of ions. The second electrode 130 includes a conductive mesh enclosed on the other surface of the dielectric 110, e.g., the outer surface of the dielectric 110.

The circuit unit 140, which generates a high voltage to be applied to the first electrode 120 and the second electrode 130, converts an electrical power supplied from an external source into a pattern of a high voltage AC and then applies to the first electrode 120 and the second electrode 130.

The circuit unit 140 includes: high-voltage output terminals 141 and a ground terminal 142 that respectively contact the first electrode 120 and the second electrode 130; a PCB (printed circuit board) 143 to which the high-voltage output terminals 141 and the ground terminal 142 are fixed for connection; and a transformer 144, installed at the PCB 143, for converting an AC supplied to the PCB 143 into a high voltage AC.

The high-voltage output terminals 141 and the ground terminal 142 are made of a conductive material in order to apply the high-voltage AC to the first electrode 120 and the second electrode 130, and respectively contact the first electrode 120 and the second electrode 130 with elasticity in order to maintain the stable contact therewith.

Each of the high-voltage output terminals 141 has a portion which extends from the PCB 143 and is formed to have a curved end, so that the curved end having an elasticity can contact the first electrode 120 disposed on the inner surface of the dielectric 110.

The ground terminal 142 has a portion which extends from the PCB 143 and is curved to have a curved end 142*b* surrounding the second electrode 130. Hence, the curved end 142*b* can contact the second electrode 130 disposed on the outer surface of the dielectric 110 with an elasticity.

The PCB 143 has a circuit pattern thereon, and the high-voltage output terminals 141 and the ground terminal 142 are fixed to both ends of the PCB 143 for electrical connection. The high-voltage output terminals 141 and the ground terminal 142 are installed to contact the inner surface and the outer surface of the dielectric 110, respectively. Fastening members 146 is used to fix one ends of the high-voltage output terminals 141 and the ground terminal 142 to the PCB 143.

Each of the fastening members 146 includes a bolt 146*a* and a nut 146*b*, for example. Meanwhile, fastening holes 141*a*, 142*a* and 143*a* are formed in the high-voltage output terminals 141, the ground terminal 142 and the PCB 143, respectively so that the high-voltage output terminals 141 and the ground terminal 142 can be coupled with the PCB 143 by the bolts 146*a* and the nuts 146*b*.

The high-voltage output terminals 141 are formed as a pair, for example, in order to achieve a secure contact with the first electrode 120. The fastening member 146 allows the pair of high-voltage output terminals 141 to be fixed to respective sides of the PCB 143 interposed therebetween.

The circuit unit 140 is enveloped in an insulating material, for example, an insulating portion 145 provided at the outer portion of the circuit unit 140. The insulating portion 145 serves to protect the circuit unit 140 from ozone or oxides, or from the fluctuation in temperature and humidity that may occur within the discharge device and block physical, chemical and electrical deterioration between the first electrode 120 and the circuit unit 140, to thereby ensure the stability, reliability and durability of the discharge device.

The discharge device 100 of the present invention further includes a power adaptor 150 installed at an open side of the dielectric 110.

The power adaptor 150 has a plug 151 to be coupled to an external AC power supply to supply with an AC power. By electrically connecting the circuit unit 140 to one side of the power adaptor 150, the AC power supplied through the plug 151 is applied to the circuit unit 140.

The power adaptor 150 has a fitting groove 152 into which the lower end of the dielectric 110 is inserted and an accommodating recess 153 for accommodating the ground terminal 142 connected to the circuit unit 140 at the outside of the dielectric 110.

The power adaptor 150 is preferably made of an insulating material such as synthetic resin, rubber or the like in order to insulate between the high-voltage output terminals 141 and the ground terminal 142. Further, the power adaptor 150 also serves to seal the inside of the dielectric 110.

The operation of the discharge device configured as described above will be described hereinafter.

When the power adaptor 150 is connected to a socket (not shown) of the external AC power supply to which an AC is supplied, a high voltage is supplied to the circuit unit 140 via the power adaptor 150.

The high voltage supplied from the circuit unit 140 is applied to the first electrode 120 and the second electrode 130 respectively through the high-voltage output terminals 141 and the ground terminal 142 with the dielectric 110 interposed therebetween, and ion clusters are then generated due to electrical silent discharge.

In the discharge device of the present invention, as described above, the generated ion clusters are mixed with contaminated indoor air, thereby exhibiting strong oxidizing power and sterilizing power. Accordingly, volatile organic compounds, offensive odors and the like in the indoor air are oxidized and removed. Further, bacteria, viruses and the like are also sterilized.

Further, by installing the circuit unit 140 in the interior of the discharge device 100, the installation space can be minimized and the limitation on the installation space may be reduced. Moreover, by removing components such as wires for applying a high voltage to the high-voltage output terminals 141 and the ground terminal 142 and the like, the safety accident and the durability decrease caused by possible breakage of the wires can be prevented.

Furthermore, by installing the dielectric 110 and the circuit unit 140 as one unit, the output decrease caused by the extension of the wires can be prevented.

While the invention has been shown and described with respect to the embodiments, it will be understood by those skilled in the art that various changes and modification may be made without departing from the scope of the invention as defined in the following claims.

The invention claimed is:

1. A discharge device comprising:

a dielectric;

a first electrode and a second electrode arranged with the dielectric interposed therebetween; and a circuit unit to which the first electrode and the second electrode are electrically connected, for generating a high voltage to be applied to the first electrode and the second electrode, wherein the dielectric is formed in a tube shape or a pipe shape having the circuit unit installed therein.

2. The discharge device of claim 1, wherein the first electrode includes a conductive coating layer formed on an inner surface of the dielectric.

3. The discharge device of claim 1, wherein the second electrode includes a conductive mesh formed on an outer surface of the dielectric.

4. The discharge device of claim 1, wherein the circuit unit includes:

high-voltage output terminals and a ground terminal which contact the first electrode and the second electrode, respectively;

a PCB to which the high-voltage output terminals and the ground terminal are fixed for electrical connection; and a transformer installed on the PCB.

5. The discharge device of claim 4, wherein the circuit unit is enveloped in an insulating material.

6. The discharge device of claim 4, wherein the high-voltage output terminals and the ground terminal are installed to be fixed to both ends of the PCB and contact the first electrode disposed on an inner surface of the dielectric and the second electrode disposed on an outer surface of the dielectric respectively.

7. The discharge device of claim 4, wherein the high-voltage output terminals and the ground terminal are fixedly installed to the PCB using fastening members.

8. The discharge device of claim 7, wherein the high-voltage output terminals are formed as a pair, and the pair of the high-voltage output terminals are fixed to respective sides of the PCB interposed therebetween using the fastening member.

9. The discharge device of claim 4, wherein the high-voltage output terminals contact the first electrode with elasticity.

10. The discharge device of claim 4, wherein the ground terminal contacts the second electrode with elasticity.

11. The discharge device of claim 4, further comprising a power adaptor, installed at an open side of the dielectric, for supplying an external AC power to the circuit unit.

12. The discharge device of claim 11, wherein the power adaptor has an accommodating recess for accommodating the ground terminal at the outside of the dielectric.

13. A discharge device comprising:

a dielectric;

a first electrode and a second electrode arranged with the dielectric interposed therebetween, the first electrode being disposed on an inner surface of the dielectric and the second electrode being disposed on an outer surface of the dielectric; and a circuit unit to which the first electrode and the second electrode are electrically connected, for generating a high voltage to be applied to the first electrode and the second electrode, wherein the dielectric is formed in a tube shape or a pipe shape having the circuit unit installed therein, wherein the circuit unit includes:

high-voltage output terminals and a ground terminal which contact the first electrode and the second electrode, respectively; and a PCB to which the high-voltage output terminals and the ground terminal are fixed for electrical connection.

* * * * *